United States Patent
Chao et al.

Patent Number: 5,712,843
Date of Patent: Jan. 27, 1998

[54] MINIATURE OPTICAL ACCESS HEAD APPARATUS

[75] Inventors: Zu-Wen Chao; Jau-Jiu Ju, both of Shinchu, Taiwan

[73] Assignee: Industrial Technology Research Institute, Taiwan

[21] Appl. No.: 774,361

[22] Filed: Dec. 27, 1996

[30] Foreign Application Priority Data

Sep. 13, 1996 [TW] Taiwan ................................ 85111228

[51] Int. Cl.$^6$ ........................................ G11B 7/00
[52] U.S. Cl. ................................ 369/112; 369/110
[58] Field of Search ........................ 369/112, 103, 369/109, 110, 32, 44.23, 44.24

[56] References Cited

U.S. PATENT DOCUMENTS

5,428,588  6/1995  Uhuchida ................................ 369/110

*Primary Examiner*—Nabil Hindi
*Attorney, Agent, or Firm*—Rabin, Champagne & Lynt, P.C.

[57] ABSTRACT

A miniature optical head for optical disk drive units is disclosed. The head assembly comprises a polarization light-splitter means having a block-shaped body. A laser light source generates a laser light beam at a predetermined wavelength and illuminating into the block body of the polarization light-splitter means. A first quarter-wavelength light plate means arranged at a side surface of the block-shaped body of the polarizing light-splitter means is placed opposite the laser light source. A reflective diffraction grating arranged further external to the first quarter-wavelength light plate means is used for reflectively diffracting the laser light beam. A second quarter-wavelength light plate means is arranged to a surface of the block-shaped polarizing light-splitter means in a plane perpendicular to the first quarter-wavelength light plate means. A holographic optical element is arranged on a side surface of the block-shaped body opposite the second quarter-wavelength light plate means. A light sensor array is arranged further next to the holographic optical element along the path of the light beams returned by the surface of the optical disk being accessed, the returning light beams being received by the array for detecting data conveyed therein. The physical dimensioning of the optical head is suitable for head assembly miniaturization, the light energy involved in the data access operation is used without substantial loss and the light source is free from feedback noise.

13 Claims, 8 Drawing Sheets

MINIATURE OPTICAL ACCESS HEAD APPARATUS

BACKGROUND OF THE INVENTION

1. Field of the Invention

The invention relates in general to a micro-optic pick-up head for optical disk drive units. In particular, the invention relates to a miniature optical access head apparatus having reduced physical dimensions and operates substantially without loss of light energy.

2. Technical Background

Many conventional optical disk drive units, either read-only versions such as the popular CD-ROM (compact disc read-only memory) or their recordable variants such as CD-R (CD recordable), CD-E (CD erasable), as well as the upcoming DVD (digital video disk), rely on the knife-edge method for error detection and control of optical head focusing. Holographic optical elements are normally used for such purpose of optical signal read-write focusing control. On the other hand, tracking error detection and control of the optical head mechanism for these devices is usually implemented in a scheme known as three-beam method.

Figure 1:
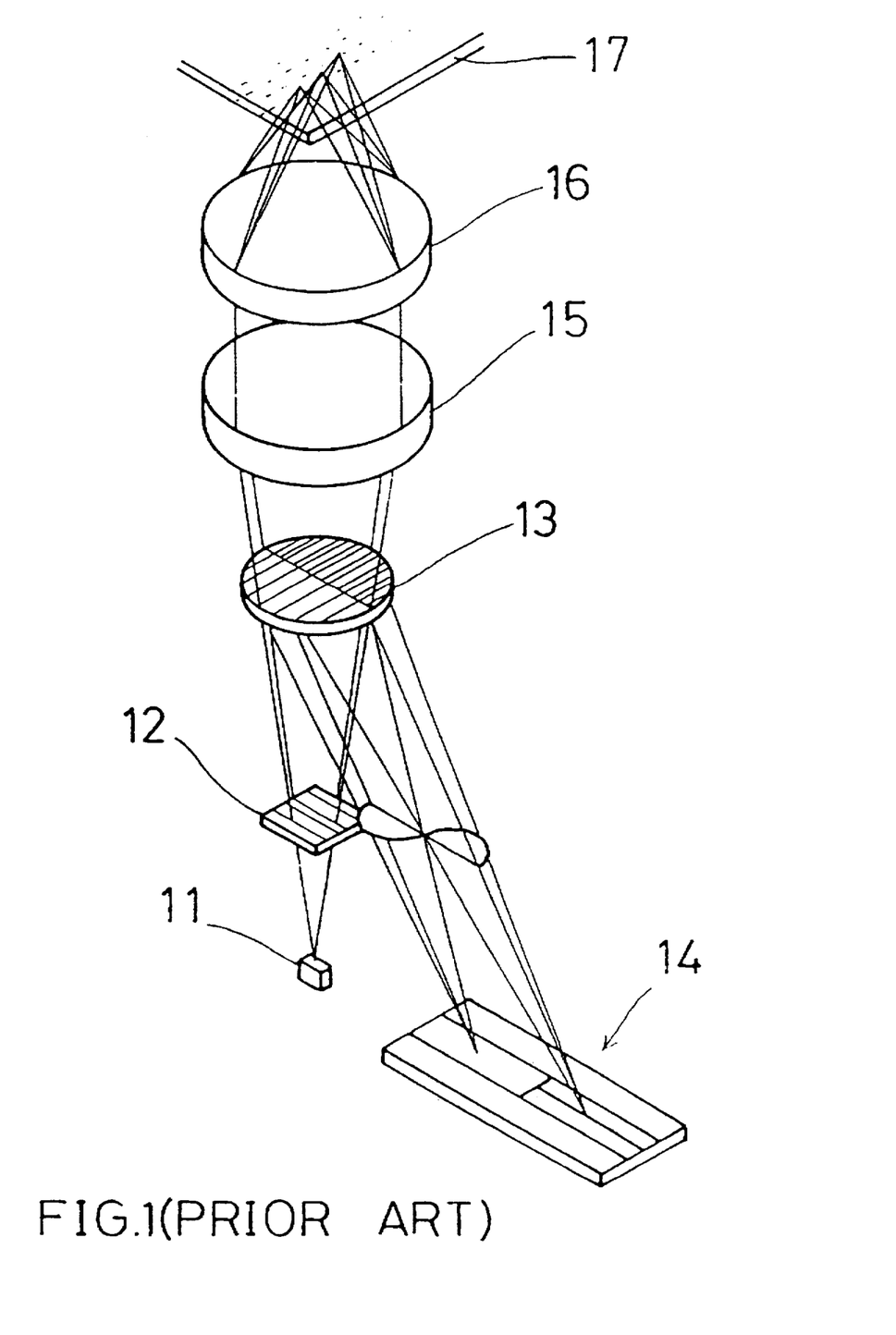
FIG. 1 is a schematic perspective view of a conventional optical head for an optical disk drive.

FIG. 1 schematically depicts a conventional optical head system employing the knife-edge method for focusing control and the three-beam method for tracking control. A brief examination of such an optical system will provide a better understanding of the disclosed invention. FIG. 1 illustrates the configuration of a conventional optical head mechanism for optical disk drives. Together with FIG. 1, FIGS. 2A and 2B schematically show the patterns of light beams directed toward the optical disk and of light beams reflected back from the optical disk during operation.

Figure 2A:
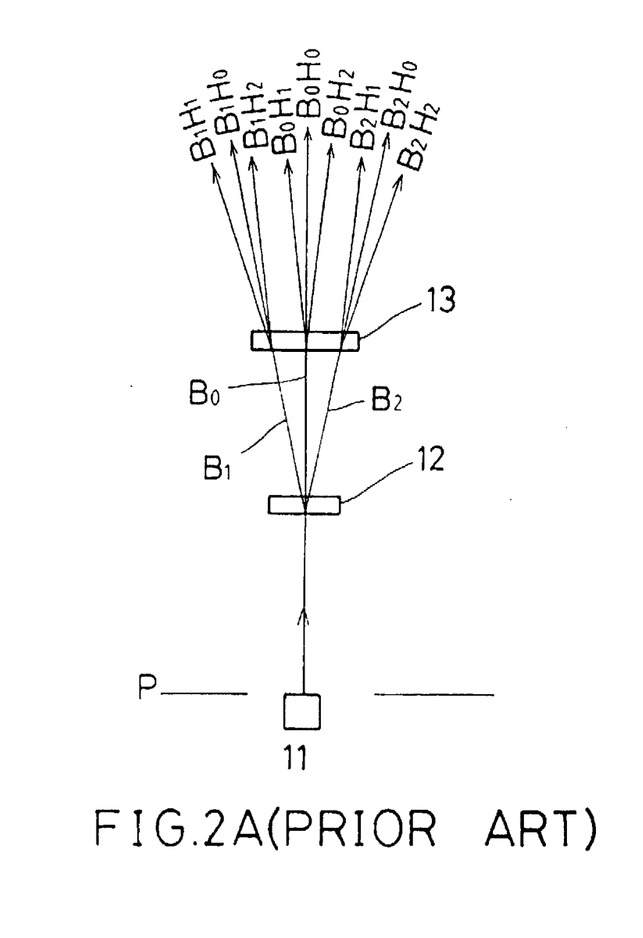
FIG. 2A schematically illustrates the pattern of light beams to an optical disk during operation of the system shown in FIG. 1.
Figure 2B:
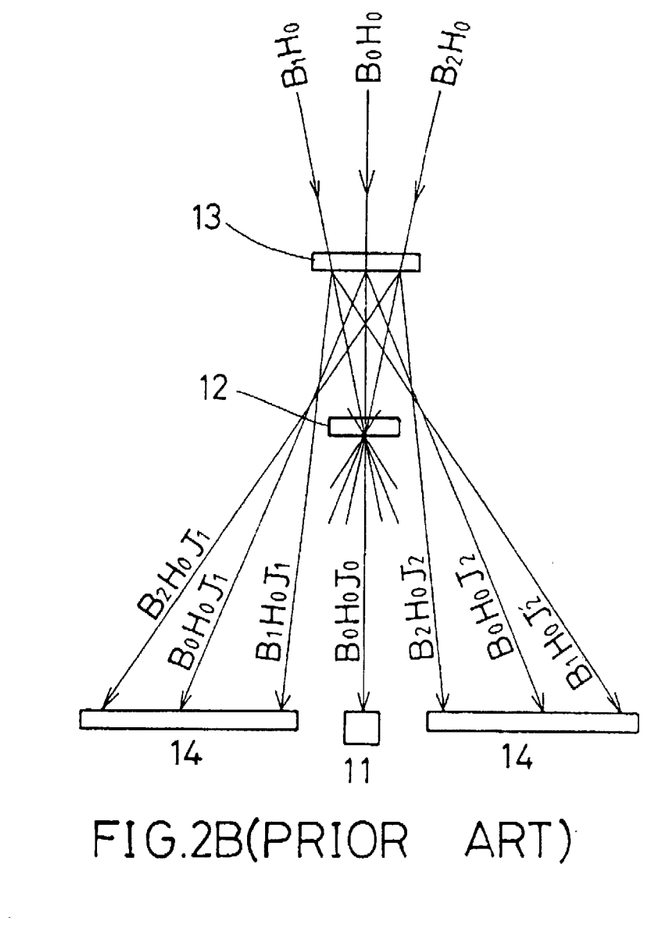
FIG. 2B schematically illustrates the pattern of light beams reflected back from the optical disk during operation of the system of FIG. 1.

With reference to FIGS. 1 and 2A, it can be seen that an upward-illuminating laser beam is produced by the laser light source 11 located in the plane P. The laser beam passes through grating 12 and is diffracted producing several higher order beams including a zero order beam, a positive first order and a negative first order beams, designated in FIG. 2A as beams $B_0$, $B_1$ and $B_2$ respectively.

The three principle beams $B_0$, $B_1$, and $B_2$ are then further diffracted by the holographic optical element 13, and each beam generates its own respective higher order diffraction beams, as shown in FIG. 2A. Letting these further-diffracted beams be designated by suffix letter H, then, a total of nine significant beams $B_0H_0$, $B_0H_1$, $B_0H_2$, $B_1H_0$, $B_1H_1$, $B_1H_2$, $B_2H_0$, $B_2H_1$, and $B_2H_2$ are generated through the holographic optical element 13.

Then, as shown in FIG. 1 only the diffracted beams $B_0H_0$, $B_1H_0$ and $B_2H_0$ are concerned and are collimated by a collimator 15, and then each impinges upon an optical disk 17 through an objective lens 16. The other six beams such as $B_0H_1$, $B_1H_2$, ..., etc., are not concerned and are not used. The reflected beams coming back from the surface of the dick 17 carry information signals and pass back to the holographic optical element 13 and then to light sensor 14. To examine more closely the optical paths of these signal-carrying laser beams, reference is now made to FIGS. 1 and 2B.

Essentially, the reflected beams may be considered as emerging from the surface of the disk 17 and then passing through the objective lens 16 and the collimator 15, before reaching the holographic optical element 13. After passage through holographic optical element 13, the beams are diffracted into beams including respective zero- and first-order beams. Letting these again-diffracted beams be designated by the further suffix letter J, a total of nine significant beams designated as $B_0H_0J_0$, $B_0H_0J_1$, $B_0H_0J_2$, $B_1H_0J_0$, $B_1H_0J_1$, $B_1H_0J_2$, $B_2H_0J_0$, $B_2H_0J_1$, and $B_2H_0J_2$ emerge on the return path from the holographic optical element 13.

An array of light sensors 14 is disposed at plane P. A typical sensor array arrangement employs a set of six sensors to pick up six of the nine returned laser beams. Essentially, beams $B_0H_0J_0$, $B_1H_0J_0$ and $B_2H_0J_0$ out of the nine returned beams are not directed toward the sensor array 14, while all of the other six beams are picked up at the sensor array 14 and subsequently converted from light into electrical signals by suitable equipment for further electronic processing. Such electronic processing does not related to the invention and will therefore not be discussed further.

Figure 3:
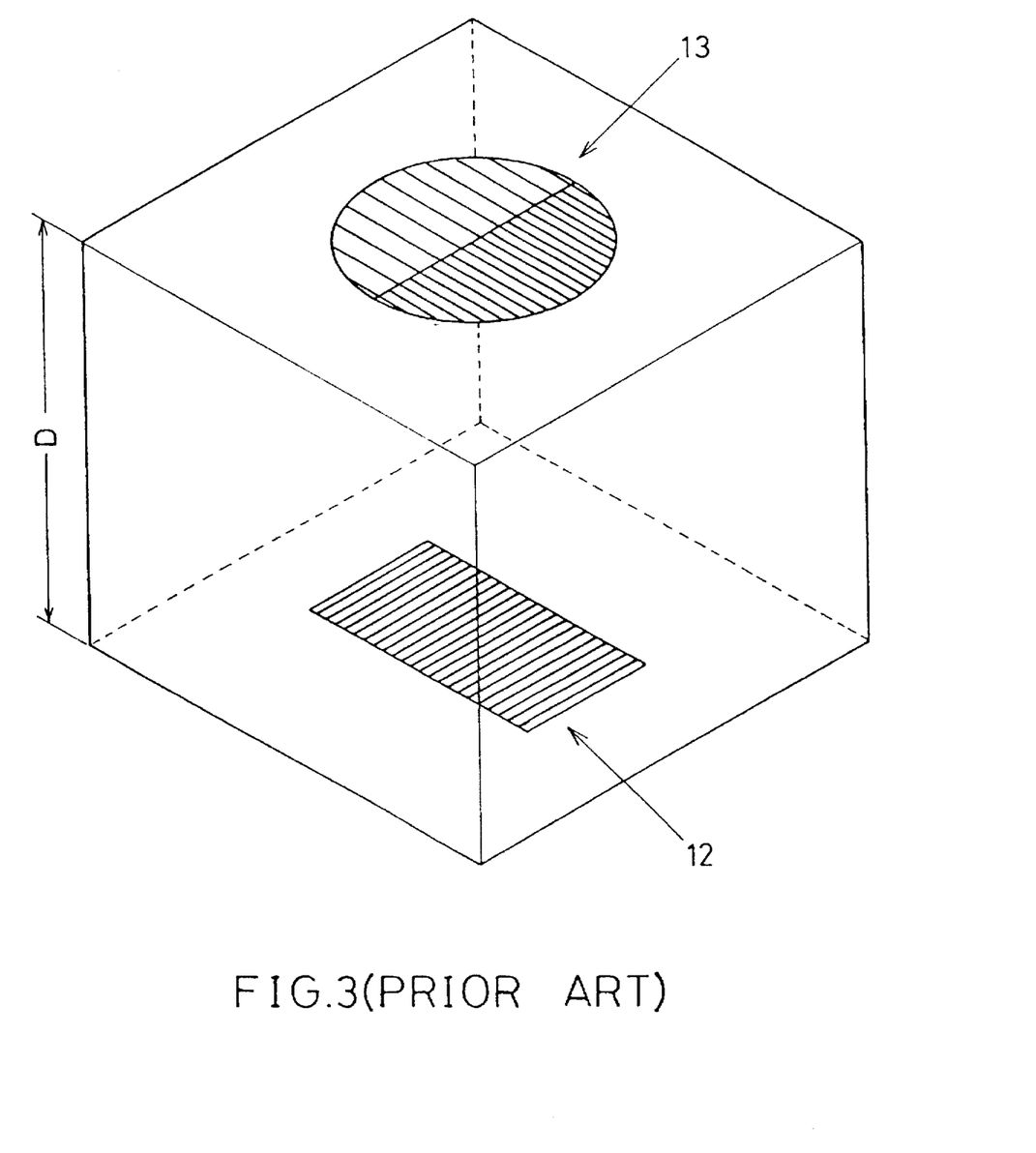
FIG. 3 is a schematic perspective view of a holographic optical element for use in the optical head system of FIG. 1.

Such a conventional optical disk pick-up head as described above suffers from at least the following disadvantages. First of all, among the nine significant laser beams output by the holographic optical element 13 that are directed toward the optical disk, only three primary beams are used. This is a significant waste of light energy. Secondly, in order to ensure that the nine laser beams emerging from the holographic optical element 13 on the return path of the light travel do not again pass through the diffraction grating 12, the distance between the holographic optical element 13 and the grating 12 must be made as large as possible. A typical distance is about 3 mm. Furthermore, the entire height from the holographic optical element 13 to the sensor 14 is about 4.5 min. For the pursuit of miniaturization of an optical head assembly for optical disk drive, a distance of 3 mm is frequently considered to be excessively large. FIG. 3 schematically depicts a conventional cubical glass framework having a holographic optical element 13 on the top surface and the grating 12 on the bottom surface. The distance D between the top and bottom surfaces is about 3 mm, which as mentioned above constitutes a considerably large component for the optical head mechanism. A third disadvantage is that there is a further waste of light energy because three out of the nine returning beams are not picked up by the array of light sensors. Of these, the beam $B_0H_0J_0$ would inevitably travel directly back into the light source 11 which, as feedback, causes interference with the light-emitting operation.

SUMMARY OF THE INVENTION

It is therefore an object of the invention to provide a miniature optical access head apparatus for optical disk drive devices that does not suffer from the losses due to significant diffracted light beam component in the laser beam illuminating segment of the operational light path, thereby to provide improved performance of the apparatus.

It is another object of the invention to provide a miniature optical access head apparatus for optical disk drive devices having a reduced thickness of the material supporting the diffraction grating and the holographic optical element, so as to reduce the overall physical dimension of the apparatus.

It is still another object of the invention to provide a miniature optical access head apparatus for optical disk drive devices which does not lose any significant diffracted light beam components in the laser beam returning segment of the operational light path, to thereby provide improved performance of the apparatus.

It is yet another object oft he invention to provide a miniature optical access head apparatus for optical disk drive devices which eliminates feedback interference in the illuminating light source.

The invention achieves the above-identified objects by providing a miniature optical head for optical disk drive units that includes a polarizing light-splitter having a block-shaped body. A laser light source projects a laser light beam at a predetermined wavelength into the body of the polarizing beam-splitter. A first quarter-wavelength plate is arranged at a first surface of the block-shaped body of the polarizing beam-splitter opposite the laser light source and receives the laser light beam. A reflective diffraction grating is arranged external to the first quarter-wavelength plate for reflectively diffracting the laser light beam received from the laser light source. A second quarter-wavelength plate is arranged at a second surface of the block-shaped body perpendicular to the first quarter-wavelength plate. A holographic optical element is arranged on a third surface of the block-shaped body opposite the second quarter-wavelength plate, and a light sensor array is arranged next to the holographic optical element in the path of light beams returning through the second quarter-wavelength plate and holographic optical element from the surface of an optical disk being accessed, the light sensor array receiving the returning light beams for detecting data conveyed therein. The physical dimensions of the optical head are suitable for head assembly miniaturization, and the light energy involved in the data access operation is used without substantial losses.

BRIEF DESCRIPTION OF THE DRAWINGS

Other objects, features, and advantages of the invention will become apparent by way of the following detailed description of the preferred but non-limiting embodiments, with reference to the accompanied drawings in which.

DETAILED DESCRIPTION OF THE PREFERRED EMBODIMENT

Figure 4:
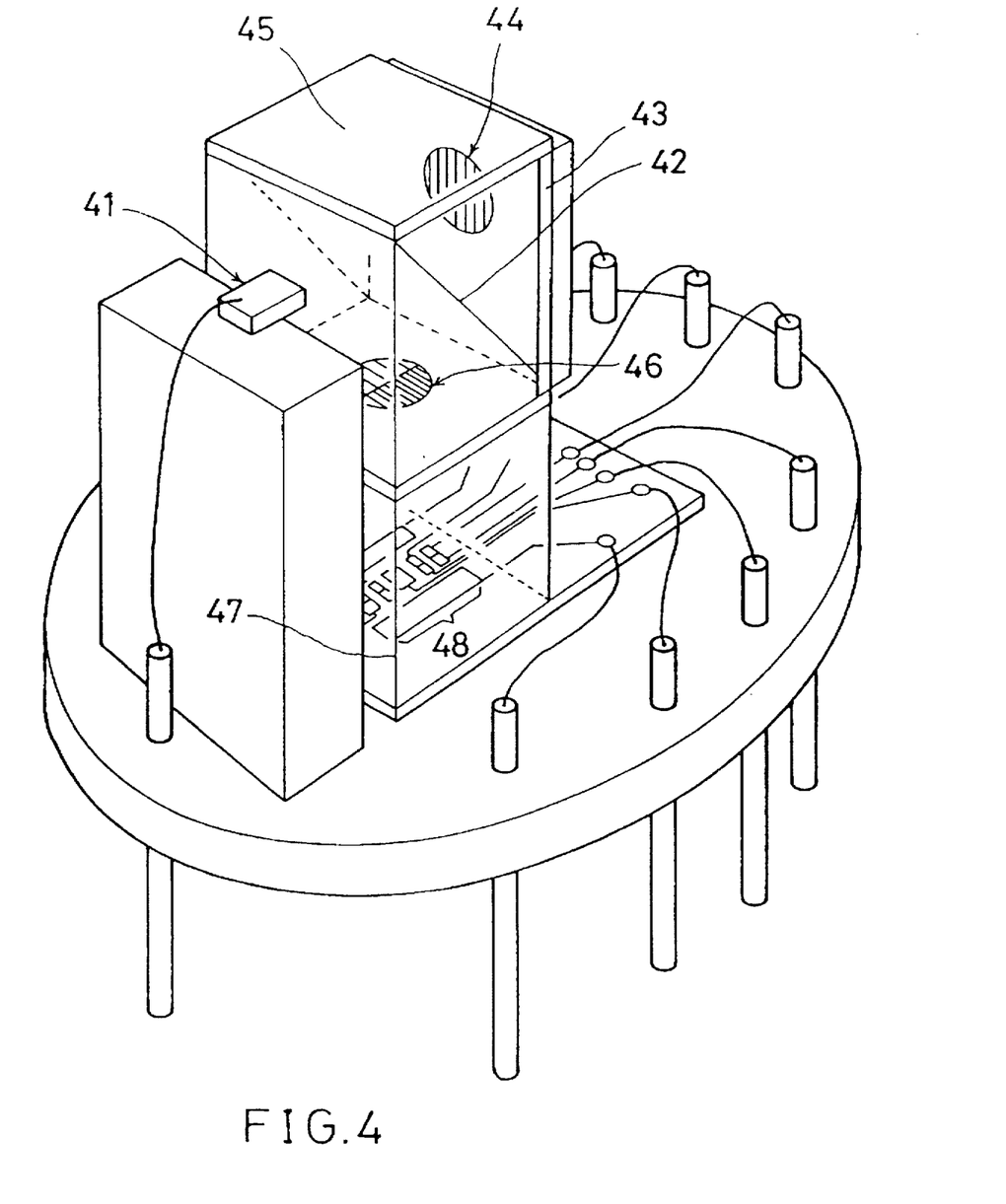
FIG. 4 is a perspective view of an optical head assembly in accordance with a preferred embodiment of the invention.

FIG. 4 is a perspective view of an optical head assembly constructed in accordance with a preferred embodiment of the invention. The assembly includes a laser light source 41, which may be a laser diode, a polarizing beam-splitter 42, a first quarter-wavelength plate 43, a reflective diffraction grating 44, a second quarter-wavelength plate 45, a holographic optical element 46, a spacing glass block 47, and a set of light sensors 48.

As is shown in the perspective view, the first quarter-wavelength plate 43 is arranged in the vertical plane of the figure perpendicular to the travel path of the laser beam emanating from the laser source 41. Essentially, this plate 43 is placed right next to the body of the polarizing beam-splitter 42. The reflective diffraction grating 44 is arranged next to the first quarter-wavelength plate 43 along the path of the laser beam. The second quarter-wavelength plate 45 is arranged in the horizontal plane of the figure above the body of the polarizing beam-splitter 42, while the holographic optical element 46 is fixed in the horizontal plane of the figure underneath the polarizing beam-splitter 42. The spacing glass block 47 is inserted beneath the holographic optical element 46, with the light sensor array 48 arranged underneath the spacing glass block 47.

The polarizing beam-splitter 42 has a block-shaped body 42A and a light-splitter plane 42B arranged diagonally inside the block-shaped body 42A. In the preferred embodiment, the block-shaped 42A is an equilateral cubic block and the beam-splitting plane 42B is positioned at a 45-degree angle 42C with respect to a side surface of the block 42A where the illuminating laser beam is to be introduced. "P" polarized light passes through the beam-splitting plane 42B while "S" polarized light is reflected thereby.

The operation of the optical head assembly is now described with reference to FIGS. 4 and 5. First of all, the laser light source 41 may originate a "P" polarized light component in the horizontal plane that passes through the polarizing plate 42, and the quarter-wavelength plate 43, and is then reflected and diffracted by the reflective diffraction grating 44 that is arranged vertically in a plane perpendicular to the path of light travel. After returning from the reflective diffraction grating 44, this light component can be considered to be equivalent to one having originated from a set of three light sources $B_0$, $B_1$ and $B_2$ as is schematically depicted at the imaginary plane 41' in FIG. 5.

The three components of the diffracted and reflected beam each then pass again through the first quarter-wavelength plate 43 to become the "S" polarized light and are reflected upward by the polarizing beam-splitter 42. This is a process equivalent to the one in which the three laser beams originate from the imaginary point sources $B'_0$, $B'_1$ and $B'_2$ at P plane, as shown in FIG. 5.

Each of the three "S" polarized light beams then passes through the second quarter-wavelength plate 45 and an objective lens (not shown in the drawing) successively to reach the surface of an optical disk (also not shown). Three small light spots are thus illuminated on the surface of the accessed optical disk.

The three light beams are reflected from the optical disk surface and pass along return paths to the detector of the optical head assembly for interpretation of the accessed data. Each of the three returning beams passes again through the objective lens (not shown) to focus at the imaginary points $B'_0$, $B'_1$ and $B'_2$ at P plane. When the three returning beams pass through the second quarter-wavelength plate 45, they each become the "P" polarized light again.

When the three returning beams reach the polarizing beam-splitter 42, each of them maintains its downward path passing directly through the splitter, and subsequently reaches the holographic optical element 46. At the holographic optical element 46, each of the three returning beams is diffracted and three significant higher order beams for each are generated. Letting these diffracted beams be denoted by the additional suffix H, after passing through the holographic optical element 46, a total of nine significant beams identified by $B_0H_0$, $B_0H_1$, $B_0H_2$, $B_1H_0$, $B_1H_1$, $B_1H_2$, $B_2H_0$, $B_2H_1$ and $B_2H_2$ are generated.

These nine beams then pass through the spacing glass block 47, enabling them to be focused on the P plane, where a set of light sensors 48 are disposed in a corresponding pattern for the reception of the returned beams. Each of the sensors converts the corresponding received beam into an electrical signal for subsequent processing in appropriate circuits.

A comparison of the optical head assembly according to the invention and its operation as described above, with that of the prior art as described above, suggests at least the following advantages favoring the invention:

First, within the illuminating segment of the light path, from the laser beam and to the optical disk to be accessed, there is no unnecessary passage through the holographic optical element. This promotes conservation of light energy in the illuminating segment of the light path. Without the light energy loss, the light beam returning from the accessed optical disk can maintain a higher light energy so as to reduce the sensitivity requirement of the light sensors and associated electronic circuits.

Secondly, in the return path to the light sensors, the light beams leaving the holographic optical element do not need to pass through the diffraction grating again, due to the particular spatial arrangement of the components according to the invention. The grating is not in the returning light pass as in the prior art device. As a result, the optical mechanism built around the block-shaped polarization beam-splitter 42 does not require that its vertical dimension be extended to a required length, as in the described prior art. For the exemplary embodiment depicted in FIGS. 4 and 5, the vertical dimension of the block-shaped polarization beam-splitter can be in the range of about 1 mm, while the distance between the surface of the light sensor array 48 and the surface of the second quarter-wavelength plate 45 is in the range of about 2 mm.

A third advantage results from the fact that none of the returning beams traveling back to the light sensor array 48 will return to the original illuminating light source, the laser diode 41, when the beams pass downward through the polarizing beam-splitter 42. Therefore, there is no feedback light beam to interfere with the light source. Further, all of the significant beams reflected back from the disk are received and detected at the light sensor array 48. Therefore, no light energy is wasted.

Figure 5:
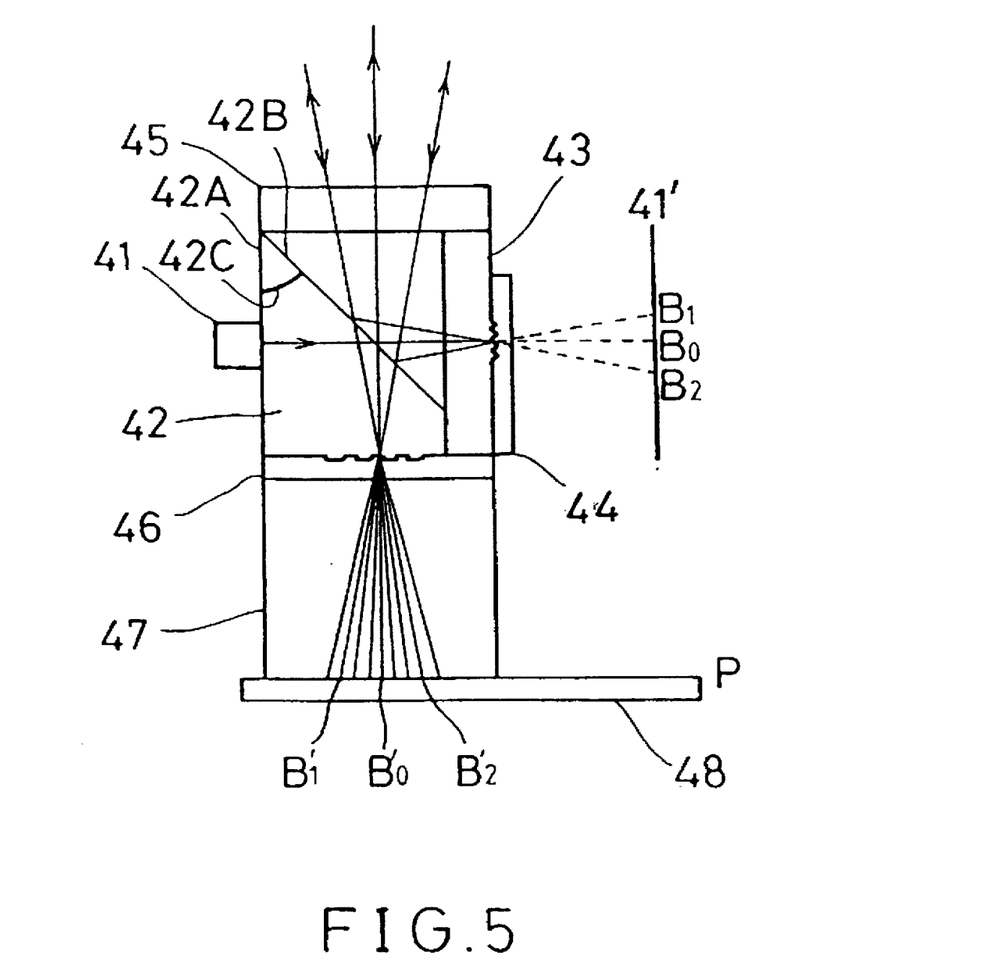
FIG. 5 schematically illustrates the pattern of light beams directed to the optical disk and reflected back therefrom during operation of the embodiment of FIG. 4.

Thus, the exemplary described embodiment of the invention, illustrated in FIGS. 4 and 5, achieves all the specified objects of the invention. Essentially, the operation of the miniature optical access head apparatus for optical disk drive devices according to the invention is without loss of significant diffracted light beam components in the laser beam illuminating segment of the light path.

The miniature optical access head apparatus for optical disk drive devices according to the invention has a reduced thickness in the support of the diffraction grating and the holographic optical element. The overall physical dimensions of the apparatus are therefore reduced.

The miniature optical access head apparatus according to the invention is also without loss of diffracted light beam components in the laser beam return segment of the light path. Performance of the apparatus is therefore improved since light reaching the light sensor array for detection and recognition has a stronger intensity.

Further, the miniature optical access head apparatus does not create feedback interference with the illuminating light source. Therefore, a data accessing illuminating light beam free from feedback noise can be obtained.

Figure 6:
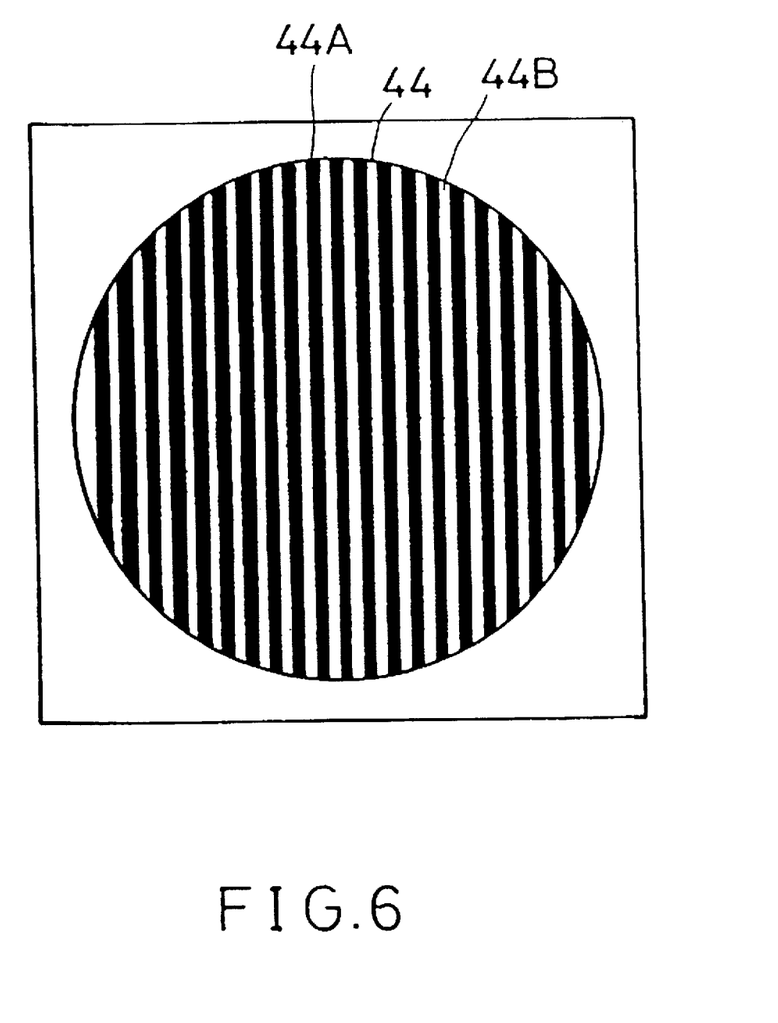
FIG. 6 illustrates the diffraction grating employed in the embodiment of FIG. 4.

FIG. 6 is an enlarged view of the reflective diffraction grating 44. This reflective grating employs parallel light-absorptive black strips 44A coated on the surface of a mirror 44B. As may be appreciable by persons skilled in the art, the black strips 44A may have widths of about 5 μm separated by distances of about 5 μm. The diameter of the circular reflective diffraction grating 44 may be in the range of about 0.5 mm (500 μm).

Figure 7:
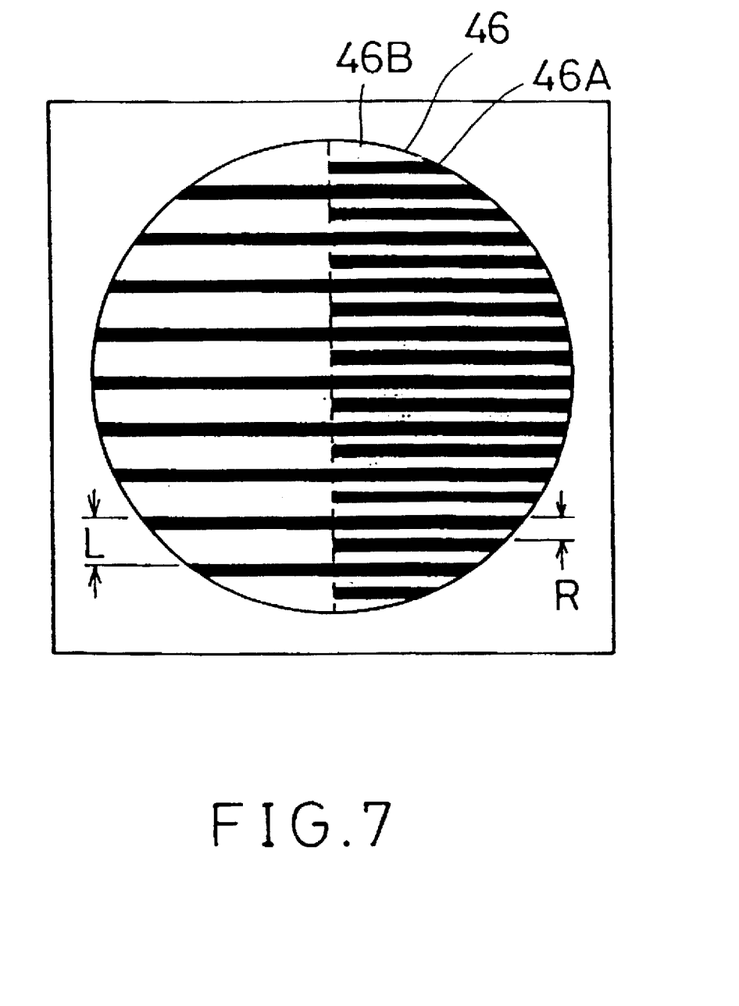
FIG. 7 illustrates the structure of the holographic element for the embodiment of FIG. 4.

FIG. 7 shows the structure of the holographic optical element 46. This holographic device employs parallel light-absorptive black strips 46a coated on the surface of a transparent glass plate 46b. There are substantially two coating portions, each forming one half of the circular area of an entire circle. The illustrated left half of the diffractive grating coating has a strip spacing larger than that of the illustrated right half. The left half preferably has a spacing between consecutive black strips in the range of about 2 to 10 μm, while the right half preferably has a spacing of about 1 to 5 μm. As persons skilled in the art are well aware, such two closely arranged diffraction gratings provide the necessary knife-edge function for focusing error detection.

As mentioned above, the miniature access head apparatus of the invention is distinguished from the conventional device at least in that the holographic optical element 46 is arranged in the horizontal plane while the reflective diffraction grating 44 is disposed in a vertical plane. With the polarizing beam-splitter 42 providing one-way light splitting, the effective length of light travel between the holographic optical element 46 and the diffraction grating 44 need not be extended in one particular dimension, and therefore facilitates a substantial reduction in the device dimensions. As a result, a thickness of about 1 mm for the block-shaped polarizing beam-splitter that supports both the holographic optical element 46 and the diffraction grating 44 provides the ability to make the dimensions of the device as small as possible. With the spacing glass block 47 incorporated, the entire height is in the range of 2 mm, which is smaller than the required height 4.5 mm between the holographic optical element and the sensor of the prior art counterpart. As a result, the physical dimension of the optical access head assembly of the invention is suitable for substantial device miniaturization.

Figure 8:
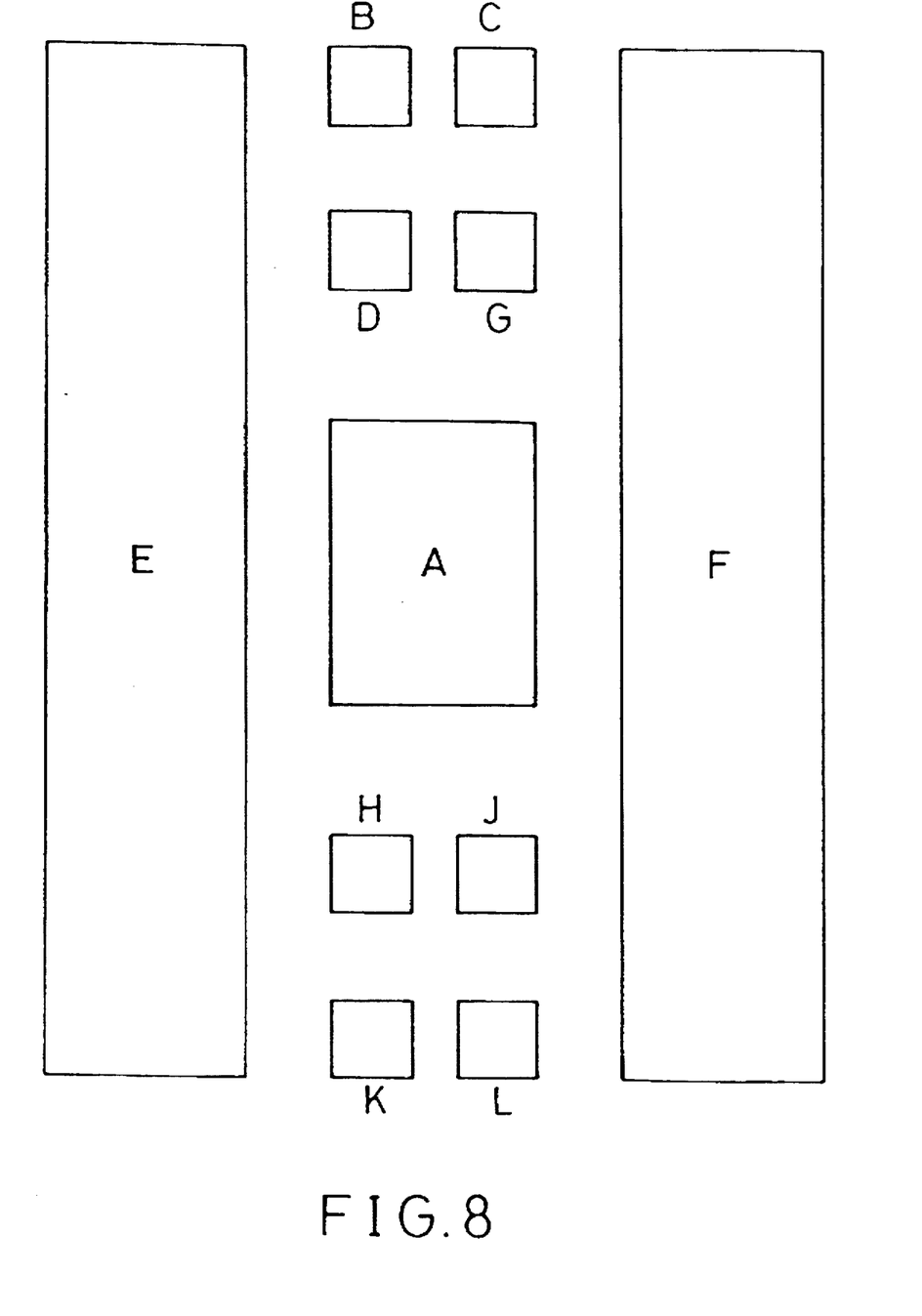
FIG. 8 schematically illustrates the layout of the light sensors used in the embodiment of FIG. 4.

FIG. 8 schematically depicts the layout of the light sensors 48 for picking up the data relayed back in the returning beams. Based on the relative designations shown in the drawing, the following signals are detected:

Focusing error signal=$(B-C)+(G-D)+(J-H)+(K-L)$,

Tracking error signal=$E-F$,

Accessing signal=$A+B+C+D+G+H+J+K+L$.

To further illustrate the advantages and improved performance of the optical access head apparatus of the invention, a comparison with a typical prior art counterpart is outlined in Table 1 below.

TABLE 1

|  | Prior Art | The Invention |
| --- | --- | --- |
| Light energy directed toward accessed optical disk surface | No. of used light beams/overall No. of generated light beams = 3/9; Substantial waste of light energy | No. of used light beams/overall No. of generated light beams = 3/3; No waste of light energy |
| Light energy reflect from accessed optical disk surface | No. of received light beams/overall No. of generated light beams = 6/9; Substantial waste of light energy | No. of received light beams/overall No. of generated light beams = 9/9; No waste of light energy |
| Interference feedback to the laser source | Yes | No |
| Holographic optical element | Pass-through | Pass-through |
| Diffraction grating | Pass-through | Reflective |
| Spatial relationship between holographic optical element and diffraction grating | Parallel | Perpendicular |
| Overal system hight (Typical) | 4.5 mm | 2 mm |
| No. of polarization light-splitter used | 0 | 1 |
| No. of quarter-wavelength light filter used | 0 | 2 |
| No. of laser diode used | 1 | 1 |
| No. of light sensors array | 1 | 1 |

Based on the above outlined comparison, advantages of the miniature optical access head apparatus according to the invention may be summarized as:

1. Substantially no waste of light energy is involved in the optical operation.
2. Systematically smaller height profile is suitable for device miniaturization.
3. No feedback noise is introduced to the light source.

Thus, while the invention has been described by way of examples and in terms of preferred embodiments, it is to be understood that the invention is not limited thereto. To the contrary, it is intended to cover the various modifications as well as similar arrangements. The scope of the appended claims should be accorded the broadest possible interpretation so as to encompass all such modifications and similar structures and arrangements.

What is claimed is:

1. A miniature optical access head apparatus for an optical disk drive device comprising:

a polarizing beam-splitter having a block-shaped body;

a laser light source for providing laser light at a predetermined wavelength into said block-shaped body;

a first quarter-wavelength plate arranged at a first surface of said block-shaped body opposite said laser light source;

a reflective diffraction grating arranged external to said first quarter-wavelength plate for receiving the laser light through the first quarter-wavelength plate and for reflectively diffracting the received laser light back through said first quarter-wavelength plate;

a second quarter-wavelength plate arranged at a second surface of said block-shaped body perpendicular to said first quarter-wavelength plate, for receiving light from said polarizing beam-splitter and providing circularly polarized light to an optical disk surface;

a holographic optical element arranged at a third surface of said block-shaped body opposite said second quarter-wavelength plate, for receiving and diffracting light reflected from the optical disk surface through said second quarter-wavelength plate; and a light sensor array arranged to receive diffracted light from said holographic optical element, and provide an output representing data contained therein.

2. The optical access head apparatus of claim 1, wherein said polarizing beam-splitter further comprises a beam-splitting plane arranged diagonally in said block-shaped body for selectively passing or reflecting light incident thereon.

3. The optical access head apparatus of claim 2, wherein said beam-splitting plane is at an angle of 45 degrees with respect to the laser light provided by said laser light source.

4. The optical access head apparatus of claim 1, wherein said laser light source is arranged to provide the laser light into said polarizing beam-splitter through a surface of said block-shaped body at about a center thereof.

5. The optical access head apparatus of claim 1, wherein said reflective diffraction grating reflectively diffracts the laser light incident thereon into a group of higher-order diffracted light beams.

6. The optical access head apparatus of claim 5, wherein the laser light from the laser source passes through a beam-splitting plane of said polarizing beam-splitter and said first quarter-wavelength plate before reaching said reflective diffraction grating.

7. The optical access head apparatus of claim 5, wherein the group of higher-order light beams are provided to said beam-splitter plane and are reflected thereby to said second quarter-wavelength plate.

8. The optical access head apparatus of claim 1, further comprising a transparent glass block inserted between said sensor array and said holographic optical means.

9. The optical access head apparatus of claim 8, wherein said block-shaped body comprises a rectangular block-shaped body having a width dimension of about 1 mm between two surfaces thereof; and wherein said second quarter-wavelength plate and said holographic optical element are arranged at respective ones of said two surfaces.

10. The optical access head apparatus of claim 9, wherein said glass block width dimension of about 1 mm is along a path of light beam passage.

11. A method of data reading comprising reading data utilizing the optical access head apparatus of claim 1.

12. A method of data reading and writing comprising reading and writing data utilizing the optical access head apparatus of claim 1.

13. A miniature optical access head apparatus for an optical disk drive device comprising:

polarizing beam-splitter means for selectively passing or reflecting light therethrough, having a block-shaped body and a beam-splitting plane arranged diagonally in said block-shaped body;

a laser light source generating a laser light beam at a predetermined wavelength, said laser light source being arranged to provide the laser light beam into said polarizing beam-splitter means at a first side surface of said block-shaped body at about a center thereof;

a first quarter-wavelength plate means for manipulating light therein and arranged at a second side surface of said block-shaped body opposite said first side surface;

a reflective diffraction grating arranged external to said first quarter-wavelength plate means, for reflectively diffracting the laser light beam received from said laser light source through said first quarter-wavelength plate means into a group of higher-order diffracted light beams, wherein the laser light beam passes thought said polarizing beam-splitter means and said first quarter-wavelength plate means before reaching said reflective diffraction grating;

a second quarter-wavelength plate means for manipulating light therein and arranged at a top surface of said block-shaped body perpendicular to said first quarter-wavelength plate means, the group of higher-order diffracted light beams being reflected by said beam-splitting plane and directed to said second quarter-wavelength plate means;

a holographic optical element arranged on a side surface of said block-shaped body opposite said second quarter-wavelength plate means; and a light sensor array disposed below said holographic optical element for receiving light beams returning from an optical disk surface through said second quarter-wavelength plate means, said polarizing beam-splitter means, and said holographic optical element, and detecting data conveyed in the returning light beams.

* * * * *